Feb. 18, 1936.     R. B. DAY     2,031,560
METHOD AND APPARATUS FOR TREATING RUBBER ARTICLES
Filed Sept. 4, 1931     4 Sheets-Sheet 2

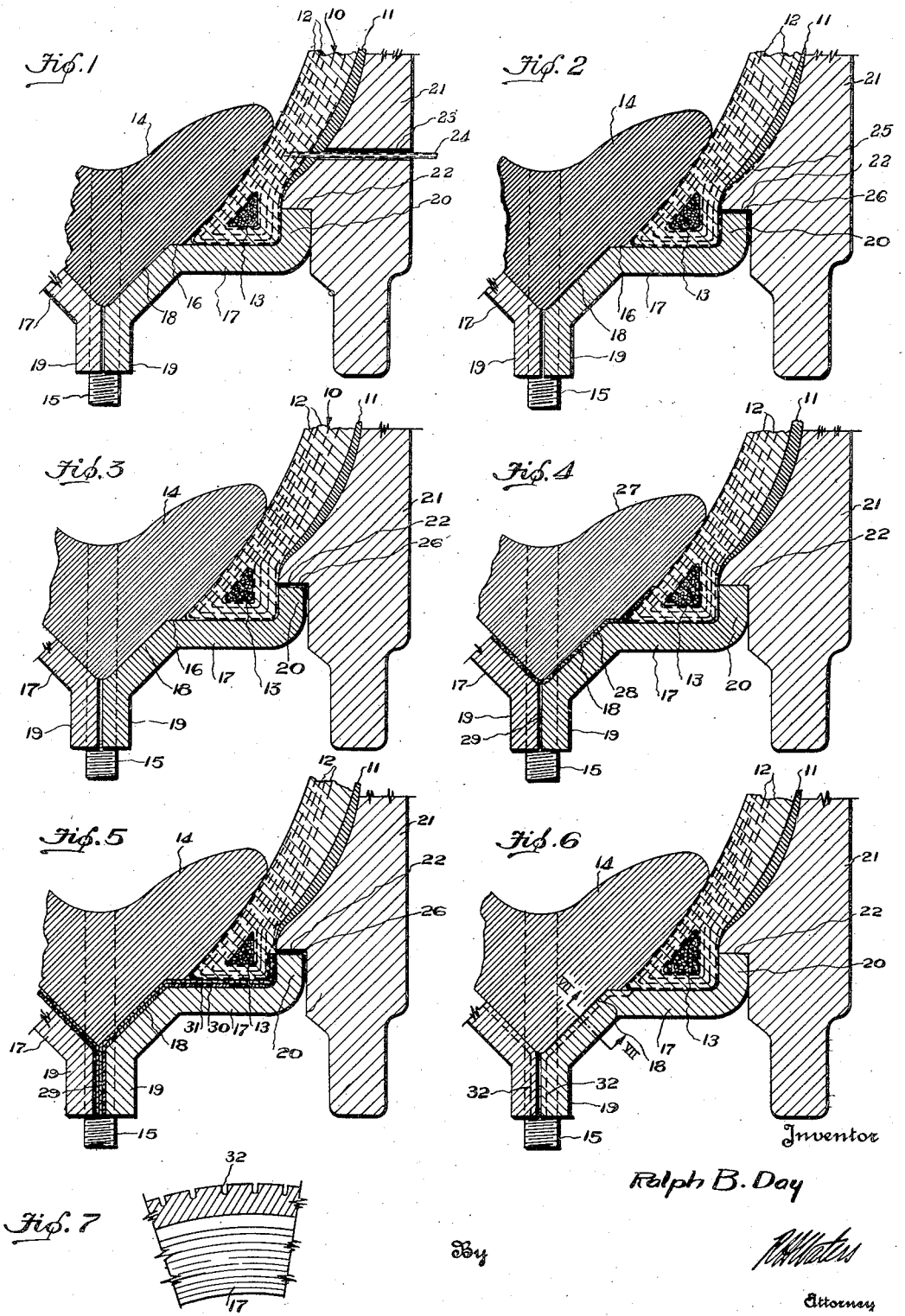

Inventor
Ralph B Day

By
Attorney

Inventor
Ralph B Day

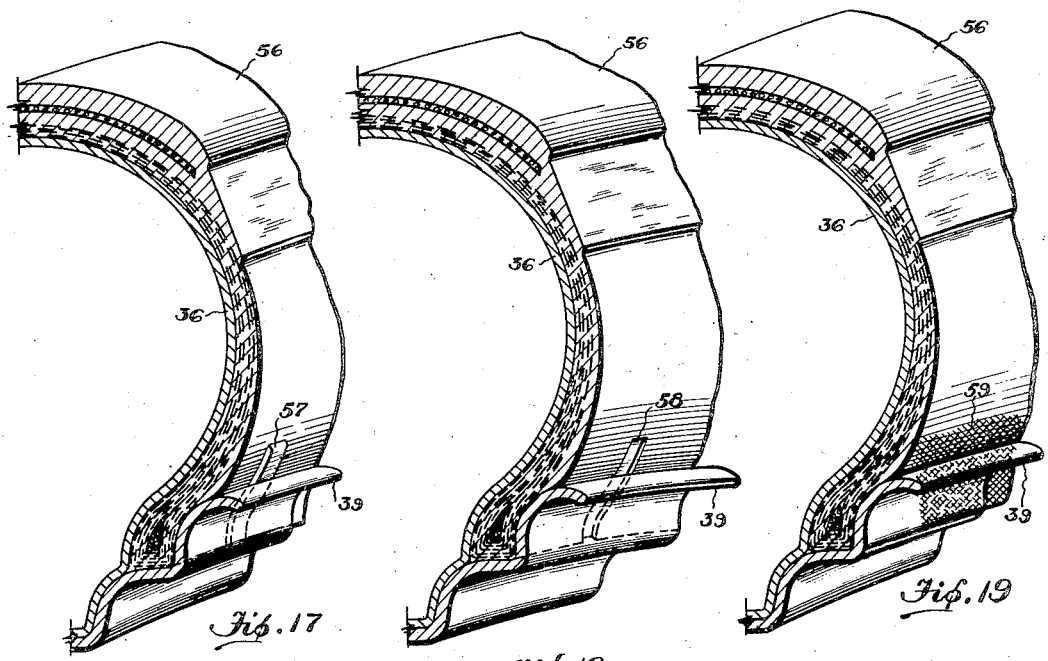
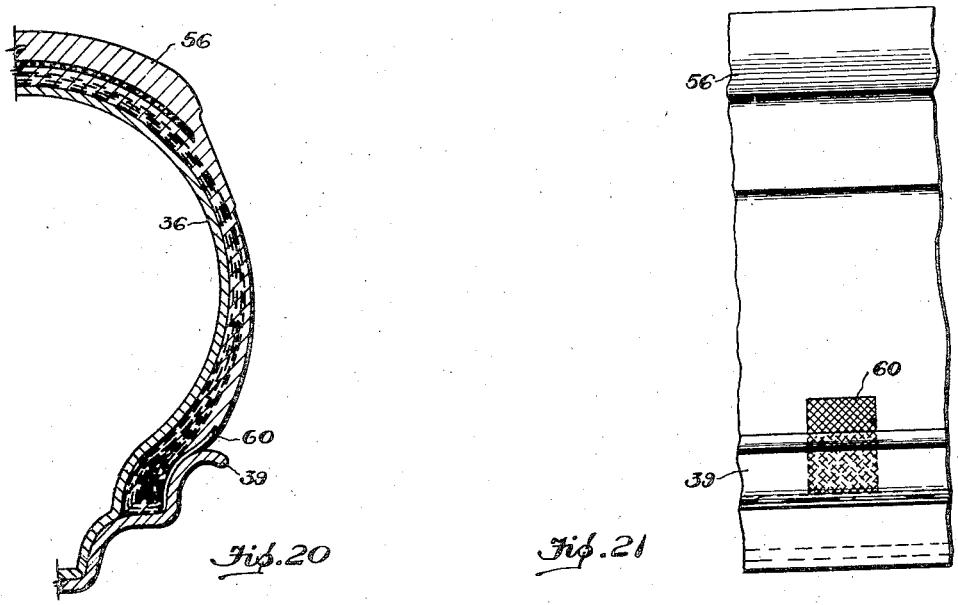

Patented Feb. 18, 1936

2,031,560

UNITED STATES PATENT OFFICE 2,031,560

METHOD AND APPARATUS FOR TREATING RUBBER ARTICLES

Ralph B. Day, Akron, Ohio, assignor to Wingfoot Corporation, Wilmington, Del., a corporation of Delaware Application September 4, 1931, Serial No. 561,122

5 Claims. (Cl. 18—42)

This invention relates to improvements in rubber articles and more particularly to pneumatic tires wherein fluid pressure is utilized to expand the tires while in use on vehicles, and it further relates to methods of and apparatus for vulcanizing such tires or other articles when they contain layers of material which are pervious to gases or other fluids. This application is a continuation in part of my application Serial No. 510,101, filed January 21, 1931.

Heretofore it has been customary in building pneumatic tires to provide a tire which, when mounted on a rim and inflated, is practically impervious to gases and which will not permit the escape of any fluid contained therein. Likewise, it has been customary to provide an impervious rim for this impervious tire. The inflation of this impervious tire is usually accomplished by means of a separate inflatable inner tube disposed therein or by means of an inner tube permanently secured or formed integrally with the inner wall of the tire in a structure known as a single tube tire.

In using this impervious tire and rim on a vehicle, numerous obstacles have been encountered. For example, there is a natural seepage of the inflating fluid through the inner tube and into the carcass of the tire, and the latter being impervious does not permit the escape of this seeping fluid. The impervious rim also prevents escape of this fluid and as a consequence, the fluid permeates the cords of the carcass and tends to flow along and through these cords, but as the fluid cannot escape through the relatively thick rubber sidewalls or tread portion of the tire, it forms blisters in the rubber of the sidewalls and tread and frequently causes blow-outs at these points. Likewise, tubes occasionally have small holes, such as pin holes therein, through which the fluid passes into the carcass and similar troubles occur.

I have discovered that, if some means is provided to permit the escape to the atmosphere of fluids contained within or entering into the carcass of the tire, or to permit the escape of fluids from the structure after they have seeped or leaked through the tube and before they enter the carcass, many, if not all, of the troubles incident to the action of such fluids will be overcome, and tires provided with such means are herein referred to as "vented" tires. There are many ways of venting a tire, such as by exposing the cords or fibrous material of the carcass directly to the atmosphere, or by interposing additional pervious media between the carcass and the atmosphere, thereby indirectly venting the tire. A few of the many ways are herein described.

It will be apparent that a vented tire easily may be obtained by first vulcanizing the tire in the usual manner and subsequently venting the same, but I have discovered a novel method of and apparatus for vulcanizing pneumatic tires whereby a tire, when taken from the vulcanizing mold, already is provided with venting means, thus eliminating any subsequent necessity for venting the tire.

Accordingly, it is an object of this invention to provide a pneumatic tire in which the sidewalls and tread portion will not be subject to blister formations or blowouts from the fluid within the tire.

Another object is to provide a pneumatic tire which is not impervious to fluid contained within the tire, and which has leaked or seeped through the tube.

A further object is to provide a pneumatic tire structure provided with novel means for venting the tire.

In the vulcanization of a pneumatic tire in an enclosing mold, it is customary to inflate the tire after it has been placed in the mold, by some convenient means in order to insure the proper expansion of the outer surface thereof against the inner surface of the mold, thereby to obtain an accurate reproduction of the tread design formed in the mold, upon the surface of the tire. This internal pressure also serves to compact the various layers of material composing the tire, thus providing a uniform closely bonded structure. It has been proposed to effect the expansion of the tire carcass by closing the space between the beads thereof with a suitable sealing ring termed a "bull ring" which is ordinarily composed of relatively thick rubber or similar resilient material, but which is sometimes composed of metal, such as steel, or other non-resilient material, and then admitting fluid under pressure, such as air, steam, or an inert gas, such as carbon dioxide or nitrogen, or a mixture of such gases directly into the carcass. Such methods, however, as heretofore employed, were impracticable because the gases imprisoned within the fabric of the carcass and permeating thereinto, tend to expand upon exposure to the heat required to effect vulcanization, causing the plastic rubber to be maintained extended against the walls of the mold, while, at the same time, the non-plastic fabric plies retract or separate from the rubber of the tread or adjacent plies, thus causing blow holes in the tire. Also, the carcass is frequently rent by the expanding gas upon release of the internal pressure. For this reason, it has heretofore been substantially uniform practice to employ an expansible rubber tube somewhat resembling an inner tube and termed an "airbag" for expanding the tire during vulcanization. These tubes deteriorate and within a relatively short time tend to crack and check and thus become unfit for further service. Also, they interfere with the flow of heat and hence require a relatively long time for the cure to be complete. The continued replacement of these tubes constitutes a very large item of expense in the manufacture of pneumatic tires. Moreover, in the larger sizes of tires, the labor involved in the insertion of the bags is very great.

As previously stated, I have discovered a method of and apparatus for vulcanizing pneumatic tires to produce a vented tire of the type disclosed herein, but it will be apparent that the method and apparatus also may be used to produce other than vented tires and, in fact, many articles having permeable material embedded therein. In actual practice the use of my method and apparatus has been found to substantially reduce the time necessary for curing with "airbags." Accordingly, the method and apparatus need not be limited to the production of vented tires. In this method fluid under pressure is directed into contact with the article in the mold, no inflatable member being used, and any fluid contained within or permeating into the interior layers of the pervious material is bled by suitable means from the carcass to the atmosphere or to a chamber which is subjected to internal pressure lower than that in the carcass. The fabric plies are thereby maintained in completely distended condition and the formation of blow holes is prevented. It will be seen that, in many instances, the means utilized for bleeding the carcass during vulcanization may be an integral part of the tire, and will serve to vent the tire when in use on a vehicle.

I am aware of previous attempts to cure tires without the use of "airbags" by lining the inner surface of the carcass with an impervious layer of rubber and expanding the carcass by direct contact of fluid against this rubber coating, but such practice is prohibitive because too expensive, and because the increased thickness of the tire is undesirable. My invention does not require the use of such an impervious lining, although my bleeding principle can be successfully used in curing the rubber lined tires.

Therefore, a further object of the invention is to provide a novel method of and novel apparatus for vulcanizing pneumatic tires and the like, in which the use of inflatable members, such as "airbags" is obviated and in which the formation of gas bubbles or blow holes within and about the tire is prevented.

A further object is to provide novel means for bleeding permeable material, such as a tire carcass.

Other objects and advantages will become apparent from the following description.

In the drawings, I have shown several embodiments of the invention. In this showing, Fig. 1 is a partial sectional view of a tire and mold with means for bleeding the tire during vulcanization;

Fig. 2 is a similar view showing a modified means for bleeding the tire;

Fig. 3 is a similar view in which means is shown for bleeding the carcass adjacent the heels of the beads;

Fig. 4 is a similar view in which means is provided upon the sealing ring for bleeding the carcass;

Fig. 5 is a similar view showing pervious material secured to the mold ring to provide means for bleeding the carcass adjacent the beads of a tire;

Fig. 6 is a similar view disclosing a mold ring in which flutings are provided upon the surface of the ring to bleed fluid from the tire;

Fig. 7 is a sectional view taken substantially on line VII—VII of Fig. 6;

Figures 8, 9, 10:
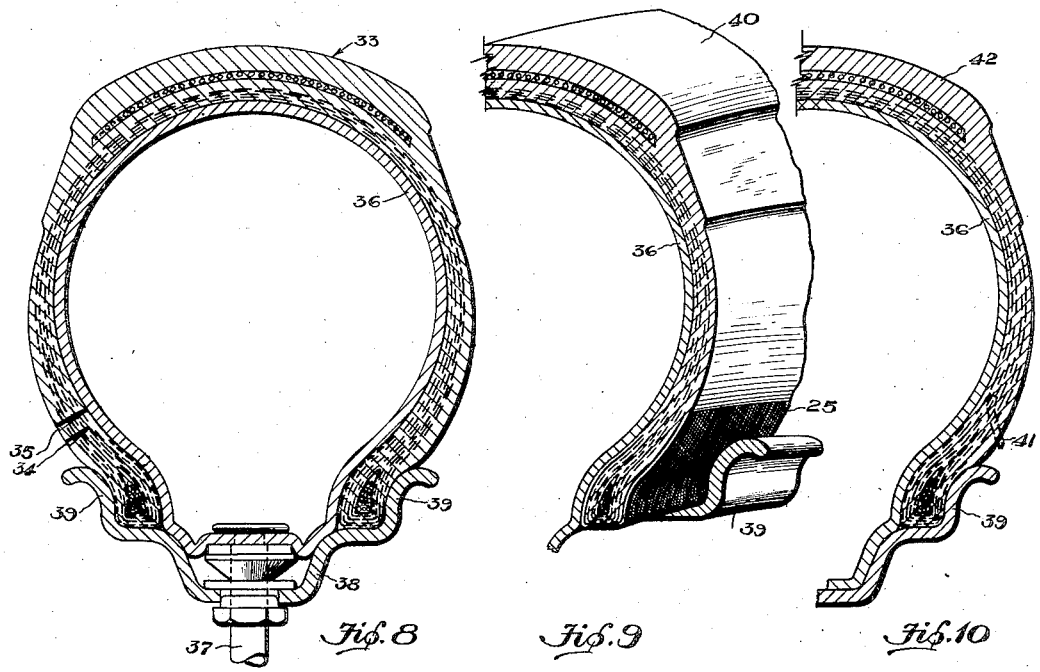
Fig. 8 is a cross section of a tire illustrating a vulcanized vented tire mounted on a rim.
Fig. 9 is a fragmentary perspective view embodying a modified form of vented tire.
Fig. 10 is a cross-section of half a tire showing a modified form of vented tire.

Figs. 13, 14, 15, and 16 are cross sections of half a tire, each showing a modified form of vented tire;

Figs. 17, 18, and 19 are fragmentary perspective views, each showing a modified form of vented tire;

Fig. 20 is a cross-section of half a tire embodying a modified form of vented tire; and Fig. 21 is a side elevation of a portion of the tire shown in Fig. 20.

Referring to Fig. 1 of the drawings, a tire indicated as a whole by the numeral 10, of substantially conventional construction, comprises an outer layer of rubber compound 11 forming the sidewall of the tire and a plurality of layers of plies 12, of pervious material, such as rubber coated cord fabric or other fibrous material. These plies, at their margins, enclose bead rings 13 which preferably are composed of a plurality of relatively small wires that are at least partially embedded in rubber compound. It will be understood that the tire is provided with a tread and any other portions needed to complete the structure, but these need not be shown in order to understand the invention.

The space between the beads of the tire is filled by means of sealing ring 14, termed a "bull ring" which is adapted to press firmly against the interior surface of the tire in the region adjacent the beads and constitutes a means of sealing fluid under compression within the tire during vulcanization. Fluid for this purpose may be admitted through a conventional stem 15.

The bull ring per se is not of the essence of the present invention, except in combination with the mold structure and will only be referred to herein to explain its purpose in the operation of the device. This bull ring preferably is formed with annular shoulders 16 that normally rest upon the inner periphery of the bead enclosing or mold rings 17 that have beveled seating portions 18 upon which the inner portions of the bull ring are adapted to rest. The rings 17 may have reinforcing flanges 19 at their inner edges and flanges 20 at their outer edges, said flanges 20 engaging and confining the outer sides of the beads. The sidewalls and the tread portion of the tire carcass are enclosed by mold sections 21 having shoulders 22 formed upon the inner face thereof to coact with the upper surfaces of the flanges 20 of the rings 17. While I have shown the mold rings 17 and sections 21 as being separate, it is to be understood that they may be formed integral if desired.

The mold sections 21 are provided with one or more lateral passages 23 that extend inwardly into the regions adjacent the bead of the tire. These passages are designed to receive tubular needles 24 or the like, which may be extended therethrough and into the side of the carcass adjacent the cords of the tire for a purpose to be described. It is to be understood that, if desired, provision also may be made for inserting needles into various portions of the carcass other than at the point illustrated, but it is preferred that the needles be inserted at points which will lie slightly above the upper edge of the flange of a rim on which the tire is to be mounted when in use after vulcanization.

In the operation of the mold structure, the bull ring 14 is disposed between the beads of the tire, and the mold rings 17 are suitably secured in position to maintain the beads in engagement with the bull ring. The mold sections 21 are then placed in position to complete the enclosure of the tire which is to be vulcanized. Fluid under pressure is then admitted to the tire carcass through the stem 15 to expand the carcass into engagement with the surfaces of the mold, and the tire is vulcanized in any suitable manner except as hereafter described. The inflation may be accomplished with any suitable fluid, but preferably an inert gas, such as carbon dioxide or nitrogen. However, air or steam also may be used when the tire is provided with an insoluble lining whereby the rubber will not be exposed to oxygen during cure.

When the tire is thus placed in the mold and subjected to pressure which is usually approximately 200 pounds per square inch, the fluids imprisoned within the fabric plies 12, as well as any fluid which may penetrate into the carcass, tend to follow the permeable textile cords thereof and are conducted downwardly to the tubular needles 24 and permitted to escape therethrough to the atmosphere or to a chamber subjected to pressure lower than that in the carcass. In this way, any tendency to form bubbles or blow holes within the tire carcass or upon the outer surface between the latter and the mold sections during vulcanization or immediately subsequent thereto is obviated. Likewise, retraction or separation of the cords from the rubber is obviated. In most cases, the degree of bleeding possible will vary with the degree of pressure differential between the outside and the inside of the carcass. It is, of course, essential that the latter value be maintained sufficiently higher than the former value to prevent blowing. In actual practice, it is found that excellent results can be obtained by employing substantially the values employed in curing with airbags, which are well known and need not be referred to. However, these values may be varied at will without departing from the spirit of the invention.

After the vulcanized tire is removed from the mold and the needles 24 are removed, one or more openings will be formed in the tire where the needles were inserted and, as will later be pointed out, these holes are preferably left as is, thereby providing one or more passageways between the cords of the tire and the atmosphere to vent the tire when in use on a vehicle.

In Fig. 2, a modified means is disclosed for bleeding the tire during vulcanization in which a pervious chafer strip 25 is extended outwardly of either or both beads and upwardly on the sidewall preferably to a point where the upper edge of the strip will extend slightly above the flanges of a rim on which the tire is used after being vulcanized. In this form of the invention, the mold structure is substantially the same as in Fig. 1 except that a passageway 26 is provided between the shoulder 22 and the flange 20. Also, the passage 23 and needle 24 are omitted. In bleeding the tire shown in Fig. 2, the fluids follow the cords of the plies downwardly to the chafer strip 25 and follow the cords of this pervious strip until they reach the passageway 26, by means of which they are conducted to the atmosphere or to an enclosing chamber as previously described. After this tire has been vulcanized, the pervious chafer is preferably left as is, to provide means for venting the tire when in use in a rim.

The method and apparatus referred to in Figs. 1 and 2 are to be used primarily for the vulcanization and production of vented tires but the principle of bleeding is not to be confined to the vulcanization of such tires and accordingly, in Fig. 3, I have shown a modified structure by means of which tires other than vented tires may be bled during vulcanization whereby the latter step in production of tires may be carried out without the use of inflated member, such as airbags.

In this form of the invention, the structure is substantially the same as described in connection with Fig. 2 except that bleeding is not accomplished by means of a chafer strip. In Fig. 3, the rubber compound 11 terminates slightly above the passageway 26 whereby the rubber compound will not close this passageway, and in bleeding, the fluids, after reaching the region of the beads, puncture through the thin film of rubber which normally is disposed upon the fabric material about the beads and is permitted to escape through the passageway 26 to the enclosing chamber or atmosphere.

In the form of the invention disclosed in Fig. 4, the tire is substantially the same as that disclosed in Fig. 3 except that the rubber compound 11 can again be extended downwardly over the beads. Also the passageway 26 is eliminated. The mold sections and the bead enclosing rings employed in this embodiment of the invention are substantially identical with those disclosed in Fig. 3. The bull ring 27 employed in Fig. 4 is also quite similar to the bull ring 14 except that a layer of permeable material 28, termed a "bleeder strip" is secured to the inner periphery thereof and extends upwardly a short distance along the inner surface of the tire carcass adjacent the beads. This material preferably comprises a relatively heavy strip of square woven canvas, but any other material of sufficient permeability may be employed in lieu thereof.

In the operation of the structure shown in Fig. 4, the imprisoned gases, upon inflation of the tire, follow the cords of the various fabric plies of the carcass and in the region adjacent the upper margin of the pervious layer the fluids puncture through the thin layer of rubber within which the inner ply of fabric ordinarily is confined. The fluids then pass downwardly through the permeable material 28 and escape through a suitable passage 29 to an outer chamber or the atmosphere. It is, of course, to be understood that in this embodiment of the invention, if desired, the layer of rubber compound 11 need not be brought down to the heel of the beads, and it is thus apparent that, if a passageway is formed between the shoulder 22 and the flange 20, similar to the passageway 26 previously referred to, fluid will be permitted to follow along the cords of the various plies of material and escape through this space at the same time it is escaping through the permeable material 28. If the tires are of large size, this dual method of bleeding away the gases may be desirable.

In the embodiment of the invention disclosed in Fig. 5, the mold sections, the bull ring and the tire structure are identical with those disclosed in Fig. 3. The bead enclosing rings are also of the same construction as that disclosed in the latter figure except that a layer 30 of permeable material is secured thereto, preferably by means of a layer of suitable cement, such as indicated at 31. When this construction is employed, the gases pass downwardly along the cords of the fabric plies of the carcass and puncture through the thin film of rubber around the beads into the permeable layer 30. The gases then pass through the permeable material either by passing downwardly through the passageway 29 or by passing upwardly over the flange 20 and out through the space 26 between the latter and the shoulder 22.

In the embodiment of the invention disclosed in Figs. 6 and 7, the tire is of the same construction and the bull ring and mold sections employed are substantially identical with those previously disclosed in Fig. 3. However, the bead enclosing ring 17 differs from that disclosed in the former figure by the provision of a series of flutes or grooves 32 along the inner surface thereof. These grooves extend upwardly and terminate at a point adjacent or under the toes of the beads, thus providing passages through which fluid, which travels downwardly along the cords of the carcass and punctures through the thin rubber at the beads, may escape.

In the operation of the embodiments of the invention disclosed in Figs. 2 to 6, the tires are disposed in the molds, inflated and vulcanized, except for the difference in bleeding means, in substantially the same manner, as disclosed in connection with Fig. 1. For that reason, a complete description of the operation of each of these embodiments has not been included.

It will be apparent from the foregoing that each of the embodiments disclosed illustrates a novel method of and means for vulcanizing pneumatic tires without the use of an inflated member, such as an airbag, and that the disclosures in Figs. 1 and 2 are particularly adapted for producing a permanently vented tire. The use of the method and apparatus eliminates a large element of expense incidental to the vulcanization of pneumatic tires with airbags and reduces the time necessary for cure. For example one experiment showed that the time necessary for curing a 6 ply, 30 x 5 tire with an "airbag" requires 1 hour and 50 minutes, whereas the same size tire was cured by my method and apparatus in 1 hour and 5 minutes. While the various embodiments of the invention are designed primarily to permit the vulcanization of tires without airbags, it is to be understood that any of the means for bleeding also may be employed in conjunction with conventional airbags, or with the rubber lined tires previously referred to, thereby preventing blowing due to the expansion of any gases in the carcass when the tire is heated or the internal pressure is suddenly relieved. Moreover, it is to be understood that the invention is not to be limited to the use of a bull ring as the sealing means between the beads and any suitable means may be used for effecting the sealing action without departing from the bleeding principle.

The principle of bleeding has been described in detail only in connection with the vulcanization of tires, however, it readily will be apparent that any permeable material, such as cord fabric, square woven fabric, felt, intermeshing wires or, in fact, any material containing intercommunicating interstices therein, can within the purview of the invention, be bled to prevent blowing. Likewise, articles other than tires, which are composed of rubber or rubber-like material, in which pervious material is embedded, may be molded and/or vulcanized while being subjected to bleeding.

One of the reasons why a vulcanized tire is usually impervious to fluids contained therein is because the substantially thick tread and sidewall rubber will not ordinarily permit the passage of such fluids therethrough and it becomes necessary to provide means for passing the fluids through this thick rubber or around the beads or other suitable points to vent the tire.

Referring now to Fig. 8 of the drawings, the numeral 33 indicates a tire as a whole of the usual construction, preferably vulcanized by the method and apparatus heretofore described in connection with Fig. 1. The numeral 34 indicates one or more of the openings left in the tire after the needles 24 have been removed therefrom after vulcanization, thereby providing one or more passageways between the cords of the tire and the atmosphere to vent fluids from the carcass. If desired, additional openings such as indicated at 35, also may be provided in the tire extending substantially through the sidewalls thereof, but the provision of these latter openings is not essential.

The tire 33 is provided with an inflated inner tube 36 which may be separable therefrom or which may be formed as an integral part thereof. A conventional valve 37 is carried by the inner tube and is secured in proper position in a rim 38 provided with the usual bead retaining flanges 39, whereby the tire may be mounted in the rim in the usual manner.

The tire disclosed in Fig. 8 is a vented tire as long as the openings 34, and 35 if used, are above the flanges 39 whereby fluids, which seep through the tube 36 or which may leak therethrough from pin holes or the like, may pass along the cords of the carcass and out of the tire through the vent openings. In this manner, it will be apparent that the formation of blisters in the sidewall or tread and consequent blowouts are prevented because the fluid is not permitted to remain in the carcass.

In connection with the venting of tires, it will be obvious that a vented tire of the type disclosed in Fig. 8 need not be produced in accordance with the method and apparatus disclosed in Fig. 1, but a tire produced in any manner, may have one or more openings similar to the openings 34 and 35 punched therein by means of a small awl or drill and as long as the openings are above the flanges 39, such a tire will be a vented tire, within the scope of this invention. Moreover, it will be apparent that, if a rim of the type illustrated in the copending application of B. Darrow, Serial No. 571,728 filed October 29, 1931 is used, the tire need not be vented above the flange, but may be vented at any point which will permit communication with one or more of the openings in said rim.

In Fig. 9, I have illustrated a tire 40 of substantially standard construction, preferably vulcanized in accordance with the method and apparatus illustrated in Fig. 2, in which the bleeding of the tire is accomplished by means of a pervious chafer strip 25. This chafer strip is allowed to remain in place after the tire is vulcanized and it will be obvious that as long as the end of the strip is permitted to extend above the flange 39, the fluids heretofore contained within the carcass will be vented therefrom by passing outwardly through the strip.

It readily will be appreciated that vented tires can be obtained in numerous ways other than by the methods and apparatus disclosed in Figs. 1 and 2, and in Figs. 10 to 16 inclusive, I have illustrated various ways in which this can be accomplished by directly or indirectly exposing the cords of the fabric plies to the atmosphere. For example, in Fig. 10, I have illustrated means for venting the carcass without providing an opening therein which comprises embedding one or more cords 41 of fibrous permeable material in the sidewall of the tire, one end being in communication with the cords of the carcass and the other end with the atmosphere. As shown, the cord or cords 41 preferably are located adjacent and slightly above the flange 39, but it will be apparent that the cord may be located at substantially any point that will permit communication with the atmosphere. Obviously, fluid will pass out of the carcass through the cords 41.

Figure 11:
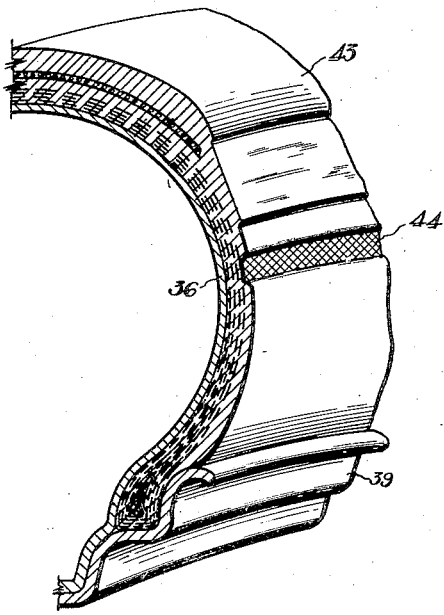
Figs. 11 and 12 are fragmentary perspective views each embodying a modified form of vented tire.

In Fig. 11, I have shown means for venting a tire 43 which comprises forming a groove 44 in the sidewall thereof which is deep enough to expose the cords of the outer ply of fabric to the atmosphere and thus permit venting through this groove. If desired, this groove may extend entirely around the periphery of the sidewall of the tire.

Figure 12:
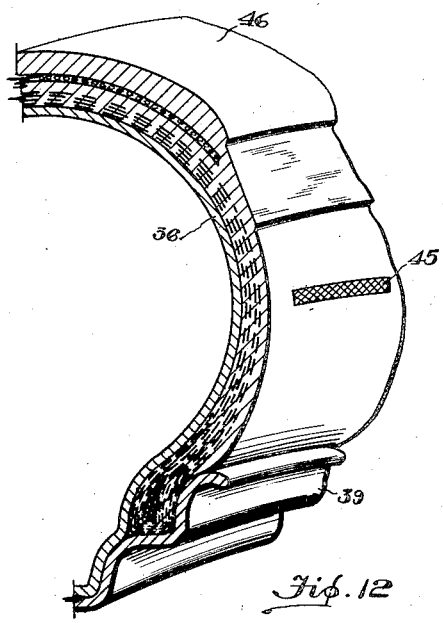

Fig. 12 illustrates a piece of permeable fabric 45 embedded in the sidewall of the tire 46, preferably directly beneath the usual number plate, which fabric engages the cords of the outer ply of the carcass whereby when the number plate is removed the outer surface of the fabric 45 will communicate with the atmosphere and fluid may pass from the cords of the carcass through the fabric 45 to the atmosphere. It will be apparent, however, that the strip of fabric 45 may be of a much greater width than shown in Fig. 12 and, if desired, may extend around the periphery of the sidewall of the tire. In fact, this fabric strip as well as the groove shown in Fig. 11, may be located any place on the tire which will permit communication with the atmosphere.

Figures 13, 14, 15, 16:
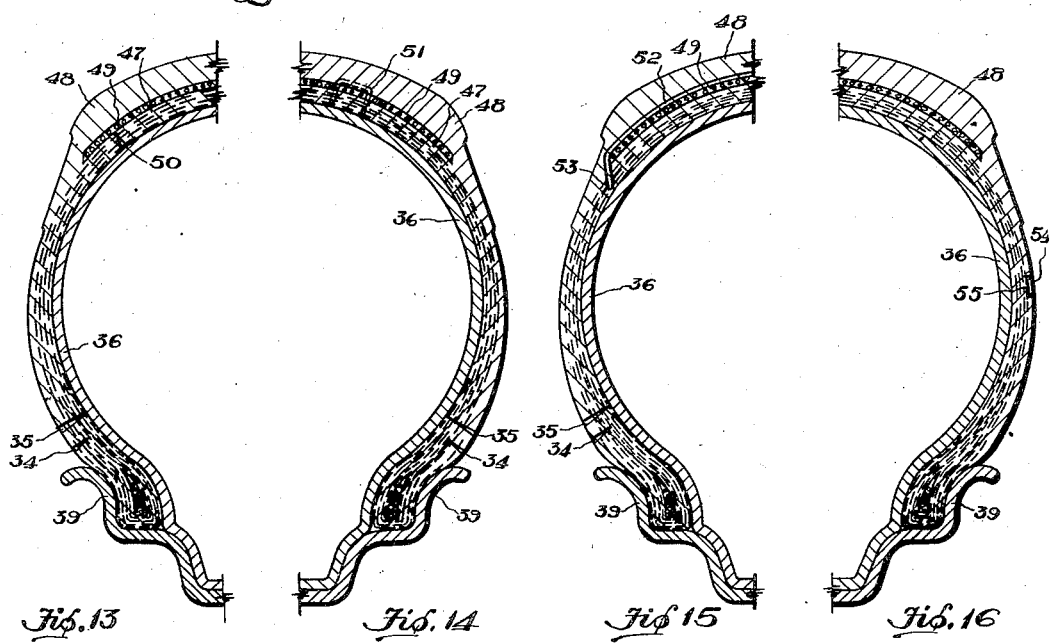

Occasionally fluid will break through the thin strip of rubber compound 47 located between the outer ply of the tire 48 and the breaker strip 49, illustrated in Fig. 13, to the breaker strip, and has difficulty in returning to the cords of the plies whereby it may be bled from the carcass. Accordingly, in such cases, I may provide an opening 50 communicating between the breaker strip and the interior of the tire and passing adjacent the cords of the fabric plies whereby such fluids may pass downwardly and out of the carcass through the openings 34 and 35, or any other suitable venting means.

The same result accomplished by the structure in Fig. 13 also may be accomplished by the structure in Fig. 14 wherein a cord 51 or the like, of fibrous, permeable material, is embedded in the carcass between the interior of the tire and the breaker strip 49, passing adjacent the cords of the fabric plies. Obviously fluids in the breaker strip will be conducted to the cords of the plies and pass out of the tire in the instance through the openings 34 and 35.

Likewise, fluid may be conducted from the breaker strip 49 by means of one or more transversely extending cords 52 of fibrous, permeable material, which are contiguous to the cords of the breaker strip and communicate near their ends with the cords of the plies as indicated at 53 in Fig. 15. Fluids will pass along the cords 52 into the cords of the carcass and in this instance pass out through the openings 34 and 35.

In order to demonstrate that a tire can be vented without directly exposing its cords to the atmosphere, Fig. 16 illustrates one or more openings 54 extending through the sidewall or other suitable portion of the tire, but not communicating with the cords thereof. However, a thin membrane or partition 55 of rubber is left between the cords of the outer ply and the atmosphere whereby the fluid, when attempting to find an outlet, will puncture through the membrane and thus escape from the carcass.

In the previous embodiments of the invention, the venting of the tire has been accomplished by exposing a portion of the cords of the carcass to the atmosphere in some suitable manner. In Figs. 17, 18 and 19, I have shown vented tires which may or may not have their cords exposed to the atmosphere and in which venting is accomplished by the passage of fluids from the interior of the tires, around the beads and over the rim flanges, or by the puncturing of the fluids through the layer of rubber surrounding the beads and over the rim flanges. Fig. 17 shows a tire 56 of the usual construction provided with one or more ridges 57 extending transversely of the beads or wholly or partially across the bottom of the beads and up the sidewall of the tire a sufficient distance to extend beyond the rim flange. In this embodiment of the invention, seeping fluids and the like will pass from the interior of the tire under the beads and/or puncture from the carcass through the thin layer of rubber surrounding the beads and along the small passages formed at the sides of the ridges 57 to the atmosphere.

As shown in Fig. 18, substantially the same result may be accomplished by providing one or more grooves 58, which also pass transversely of the beads or wholly or partially across the bottom of the beads and upwardly on the sidewall of the tire to a point above the rim flange. In this form of the invention, fluid will pass from the interior of the tire and/or of the carcass to the atmosphere along the grooves 58.

In Fig. 19, I have shown a tire provided with one or more knurled or roughened portions 59 extending in the same manner as the ridges and grooves previously described whereby a plurality of small intercommunicating passageways will be provided around the beads and sidewall to vent the tire.

Instead of using an integral chafer on the tire, as illustrated in Fig. 9, I may secure one or more pieces of permeable fabric to the tire adjacent the beads, which fabric communicates with the cords of the tire adjacent the bead portion and extends above the rim flange whereby fluid may pass through this fabric to vent the tire, as illustrated in Figs. 20 and 21.

It is believed to be apparent that I have provided a novel method and apparatus for vulcanizing pneumatic tires of substantially any type with the bleeding principle, as well as a method and apparatus for producing vented tires. Also, it will be apparent that the invention discloses the novel feature of venting tires in various other ways not possible with the method and apparatus disclosed.

Although I have illustrated a number of preferred forms of the invention and have described those forms in detail, it will be apparent to those skilled in the art that the invention is not so limited, but that various modifications may be made therein without departing from the spirit of the invention or from the scope of the appended claims.

What I claim is:

1. An apparatus for vulcanizing a hollow rubber article containing fibrous material embedded therein comprising an enclosing mold, means for inflating the article by direct pressure of fluid against the inner surface thereof, and means cooperating with the mold and extending therethrough for puncturing the article into the fibrous material to permit the escape of imprisoned fluids from within said material.

2. A method of vulcanizing a pneumatic tire which comprises disposing the latter in a closed vulcanizing mold, inflating the tire, extending a hollow needle into contact with the fabric in the body of the tire, and continuously bleeding the tire through said needle while curing the tire.

3. An apparatus for vulcanizing a pneumatic tire comprising an enclosing mold having a tire-receiving cavity, one wall of said mold having a passage extending into said cavity, means for inflating the tire, and a hollow needle extending through the passage and into the tire during the entire period of vulcanization of the tire.

4. A method of vulcanizing a pneumatic tire which comprises disposing the latter in a closed vulcanizing mold, inflating the tire by direct admission of fluid to the interior thereof, extending a hollow needle into contact with the fabric in the body of the tire, and continuously bleeding the tire through said needle while curing the tire.

5. An apparatus for vulcanizing a pneumatic tire comprising an enclosing mold having a tire-receiving cavity, one wall of said mold having a passage extending into said cavity, means for inflating the tire by direct admission of fluid to the interior thereof, and a hollow needle extending through the passage and into the tire during the entire period of vulcanization of the tire.

RALPH B. DAY.